(12) United States Patent
Carlsson

(10) Patent No.: US 8,299,166 B2
(45) Date of Patent: Oct. 30, 2012

(54) CROSSLINKABLE POLYOLEFIN COMPOSITION COMPRISING HIGH MOLECULAR WEIGHT SILANOL CONDENSATION CATALYST

(75) Inventor: Roger Carlsson, Saeve (SE)

(73) Assignee: Borealis Technology Oy, Porvoo (FI)

( * ) Notice: Subject to any disclaimer, the term of this patent is extended or adjusted under 35 U.S.C. 154(b) by 425 days.

(21) Appl. No.: 12/298,480

(22) PCT Filed: Apr. 16, 2007

(86) PCT No.: PCT/EP2007/003337
§ 371 (c)(1),
(2), (4) Date: Jan. 9, 2009

(87) PCT Pub. No.: WO2007/121884
PCT Pub. Date: Nov. 1, 2007

(65) Prior Publication Data
US 2010/0022703 A1    Jan. 28, 2010

(30) Foreign Application Priority Data
Apr. 26, 2006  (EP) .................................... 06008691

(51) Int. Cl.
*C08L 43/04* (2006.01)
*C08F 130/08* (2006.01)
*C08J 3/24* (2006.01)
(52) U.S. Cl. ..................... 524/547; 526/279; 525/326.5; 525/353
(58) Field of Classification Search .................. 524/547; 525/326.5, 353; 526/279
See application file for complete search history.

(56) References Cited

U.S. PATENT DOCUMENTS

| | | |
|---|---|---|
| 3,646,155 A | 2/1972 | Scott |
| 3,970,632 A | 7/1976 | Yoshiura et al. |
| 4,117,195 A | 9/1978 | Swarbrick et al. |
| 4,297,310 A | 10/1981 | Akutsu et al. |
| 4,351,876 A | 9/1982 | Doi et al. |
| 4,397,981 A | 8/1983 | Doi et al. |
| 4,413,066 A | 11/1983 | Isaka et al. |
| 4,446,283 A | 5/1984 | Doi et al. |
| 4,456,704 A | 6/1984 | Fukumura et al. |
| 6,005,055 A * | 12/1999 | Dammert et al. .......... 525/326.5 |
| 2002/0035215 A1 | 3/2002 | Blank et al. |

FOREIGN PATENT DOCUMENTS

| | | |
|---|---|---|
| EP | 1309631 | 4/2005 |
| WO | 95/17463 | 6/1995 |
| WO | 00/36612 | 6/2000 |
| WO | 02/06834 | 1/2002 |
| WO | 2005/003199 | 1/2005 |
| WO | 2005/041215 | 5/2005 |
| WO | 2006/017391 | 2/2006 |
| WO | WO 2006017391 A2 * | 2/2006 |

* cited by examiner

Primary Examiner — Michael M Bernshteyn
(74) Attorney, Agent, or Firm — Roberts, Mlotkowski, Safran & Cole, P.C.

(57) ABSTRACT

The present invention relates to a composition comprising (i) a crosslinkable polyolefin with hydrolysable silane groups (A), and (ii) a silanol condensation catalyst comprising an organic sulphonic acid (B) which comprises the structural element Ar—$R^1$ (I) wherein Ar is an aromatic group, which may e.g. be a benzene, naphthalene, phenantrene or anthracene group, and R1 is an organic residue comprising at least 21 C-atoms, the organic sulphonic acid (B) further comprising one, two or more sulphonic acid groups, to an article, in particular a wire or cable, comprising such a composition, and to the use of such a composition for the production of an article.

13 Claims, No Drawings

CROSSLINKABLE POLYOLEFIN COMPOSITION COMPRISING HIGH MOLECULAR WEIGHT SILANOL CONDENSATION CATALYST

The present invention relates to a polyolefin composition comprising a crosslinkable polyolefin with hydrolysable silane groups and a silanol condensation catalyst, to an article, in particular a wire or cable or a pipe, comprising such a composition, and to the use of such a composition for the production of an article.

It is known to cross-link polyolefins by means of additives as this improves the properties of the polyolefin such as mechanical strength and chemical heat resistance. Cross-linking may be performed by condensation of silanol groups contained in the polyolefin which can be obtained by hydrolysation of silane groups. A silane compound can be introduced as a cross-linkable group e.g. by grafting the silane compound onto a polyolefin, or by copolymerisation of olefin monomers and silane group containing monomers. Such techniques are known e.g. from U.S. Pat. No. 4,413,066, U.S. Pat. No. 4,297,310, U.S. Pat. No. 4,351,876, U.S. Pat. No. 4,397,981, U.S. Pat. No. 4,446,283 and U.S. Pat. No. 4,456,704.

For cross-linking of such polyolefins, a silanol condensation catalyst must be used. Conventional catalysts are for example tin-organic compounds such as dibutyl tin dilaurate (DBTDL). It is further known that the cross-linking process advantageously is carried out in the presence of acidic silanol condensation catalysts. In contrast to the conventional tin-organic catalysts the acidic catalysts allow cross-linking to quickly take place already at room temperature. Such acidic silanol condensation catalysts which are organic sulphonic acids, are disclosed, for example, in WO 95/17463, EP 1 309 631 and EP 1 301 632. The contents of these document is enclosed herein by reference.

In such crosslinkable polyolefin compositions it is desired that the components show good compatibility to each other so as to avoid e.g. decomposition of components or exudation problems. In particular, it is important that the silanol condensation catalyst is compatible with both the cross-linkable polyolefin and further components such as pigments, so that e.g. desired colour of a produced cable is obtained.

Furthermore, it is desirable that if a sulphonic acid is used as a silanol condensation catalyst, the amount to be added should be as low as possible for e.g. environmental reasons and for maintaining the sulphur content in the composition as low as possible.

It is hence the object of the present invention to provide a crosslinkable polyolefin composition comprising a sulphonic acid as silanol condensation catalyst which shows an improved compatibility with all other components of the composition, in particular with pigments, and which allows for an effective crosslinking so as to reduce the sulphur content in the composition.

It has now surprisingly been found that this object can be achieved by use of an organic sulphonic acid compound which attached to an aromatic group has an alkyl chain with a comparatively high length as a silanol condensation catalyst in a composition comprising a polyolefin with hydrolysable silane groups.

The present invention therefore provides a polyolefin composition comprising
(i) a crosslinkable polyolefin with hydrolysable silane groups (A), and
(ii) a silanol condensation catalyst comprising an organic sulphonic acid (B) which comprises the structural element $$Ar\text{—}R^1 \quad (I)$$

wherein Ar is an aromatic group, which may e.g. be a benzene, naphthalene, phenantrene or anthracene group, and $R^1$ is an organic residue comprising at least 21 C-atoms, the organic sulphonic acid (B) further comprising one, two or more sulphonic acid groups.

The composition according to the invention shows an effective crosslinking both as concerns the crosslinking speed and the finally obtained degree of crosslinking. This result is achieved with even a lower total amount of sulphur in the composition.

Furthermore, the compatibility of the composition as concerns the incorporation of further components, such as pigments, is improved, as can also be seen e.g. by the higher crosslinking rate and final crosslinking degree of the composition.

Sulphonic acid (B) may comprise one, two, three or more times the structural element (I). For example, two structural units according to formula (I) may be linked to each other via a bridging group such as an alkylene group.

The sulphonic acid group(s) are either attached to a non-aromatic, or preferably to an aromatic group in organic sulphonic acid (B), most preferably they are attached to aromatic group Ar.

In sulphonic acid (B), the aromatic group(s) Ar in addition to substituent $R^1$ may comprise further substituents, which may be the same or different from $R^1$.

Preferably, the number of $R^1$ substituents present at the Ar group is from 1 to 4, more preferably is 2.

Preferably, if further substituents are present attached to Ar these are hydrocarbyl groups, more preferably hydrocarbyl groups comprising 1 to 80 C-atoms, more preferably comprising 2 to 40 C-atoms.

However, it is most preferred that at the aromatic group Ar only substituents $R^1$, which may be the same or different, are present.

Aromatic group Ar preferably is a phenyl group, a naphthalene group or an aromatic group comprising three fused rings, such as phenantrene and anthracene, most preferably, Ar is a phenyl group.

Preferably, the number of sulphonic acid groups in sulphonic acid (B) is from 1 to 3, more preferably is 1 or 2. As mentioned, these sulphonic acid groups most preferably are attached to group Ar.

Furthermore, preferably organic sulphonic acid (B) used as silanol condensation catalyst has from 27 to 200 C-atoms, more preferably from 30 to 150 C-atoms.

$R^1$ in structural element (I) preferably has 21 to 80 C-atoms, more preferably has 24 to 40 C-atoms.

Furthermore, $R^1$ preferably is a hydrocarbyl group, which may be linear or branched, more preferably is an alkyl group, which may be linear or branched.

Preferably, the organic sulphonic acid (B) has a molecular weight $M_w$ of 410 g/mol or more, further preferred of 430 g/mol or more.

In a preferred embodiment, the organic sulphonic acid (B) hydrophobicity to hydrophilicity ratio defined to be the overall molecular weight of the sulphonic acid group(s) in (B) divided by the overall molecular weight of the non-polar groups in (B) of below 0.24, more preferably below 0.22.

The silanol condensation catalyst may also be precursor of the sulphonic acid (B) including all its preferred embodiments mentioned, i.e. a compound that is converted by hydrolysis to such a compound. Such a precursor is for example the acid anhydride of a sulphonic acid compound, or a sulphonic acid that has been provided with a hydrolysable protective group, as e.g. an acetyl group, which can be removed by hydrolysis.

Preferably, in the polyolefin composition according to the invention the silanol condensation catalyst is present in an amount of 0.0001 to 6 wt %, more preferably of 0.001 to 2 wt %, and most preferably 0.05 to 1 wt %.

The composition of the invention preferably further comprises a pigment.

The pigment preferably is contained in the composition in an amount of from 0.01 to 5 wt.-%.

The composition of the invention comprises a cross-linkable polyolefin containing hydrolysable silane groups (A). More preferably the cross-linkable polyolefin comprises, still more preferably consists of, a polyethylene containing hydrolysable silane groups.

The hydrolysable silane groups may be introduced into the polyolefin by copolymerisation of e.g. ethylene monomers with silane group containing comonomers or by grafting, i.e. by chemical modification of the polymer by addition of silane groups mostly in a radical reaction. Both techniques are well known in the art.

Preferably, the silane group containing polyolefin has been obtained by copolymerisation. In the case of polyolefins, preferably polyethylene, the copolymerisation is preferably carried out with an unsaturated silane compound represented by the formula

$$R^1SiR^2_qY_{3-q} \quad (II)$$

wherein $R^1$ is an ethylenically unsaturated hydrocarbyl, hydrocarbyloxy or (meth)acryloxy hydrocarbyl group, $R^2$ is an aliphatic saturated hydrocarbyl group, Y which may be the same or different, is a hydrolysable organic group and q is 0, 1 or 2.

Special examples of the unsaturated silane compound are those wherein $R^1$ is vinyl, allyl, isopropenyl, butenyl, cyclohexanyl or gamma-(meth)acryloxy propyl; Y is methoxy, ethoxy, formyloxy, acetoxy, propionyloxy or an alkyl- or arylamino group; and $R^2$, if present, is a methyl, ethyl, propyl, decyl or phenyl group.

A preferred unsaturated silane compound is represented by the formula

$$CH_2=CHSi(OA)_3 \quad (III)$$

wherein A is a hydrocarbyl group having 1-8 carbon atoms, preferably 1-4 carbon atoms.

The most preferred compounds are vinyl trimethoxysilane, vinyl bismethoxyethoxysilane, vinyl triethoxysilane, gamma-(meth)acryloxypropyltrimethoxysilane, gamma (meth)acryloxypropyltriethoxysilane, and vinyl triacetoxysilane.

The copolymerisation of the olefin, e.g. ethylene, and the unsaturated silane compound may be carried out under any suitable conditions resulting in the copolymerisation of the two monomers.

Moreover, the copolymerisation may be implemented in the presence of one or more other comonomers which can be copolymerised with the two monomers. Such comonomers include (a) vinyl carboxylate esters, such as vinyl acetate and vinyl pivalate, (b) alpha-olefins, such as propene, 1-butene, 1-hexene, 1-octene and 4-methyl-1-pentene, (c) (meth)acrylates, such as methyl(meth)acrylate, ethyl(meth)acrylate and butyl(meth)acrylate, (d) olefinically unsaturated carboxylic acids, such as (meth)acrylic acid, maleic acid and fumaric acid, (e) (meth)acrylic acid derivatives, such as (meth)acrylonitrile and (meth)acrylic amide, (f) vinyl ethers, such as vinyl methyl ether and vinyl phenyl ether, and (g) aromatic vinyl compounds, such as styrene and alpha-ethyl styrene.

Amongst these comonomers, vinyl esters of monocarboxylic acids having 1-4 carbon atoms, such as vinyl acetate, and (meth)acrylate of alcohols having 1-4 carbon atoms, such as methyl(meth)-acrylate, are preferred.

Especially preferred comonomers are butyl acrylate, ethyl acrylate and methyl acrylate.

Two or more such olefinically unsaturated compounds may be used in combination. The term "(meth)acrylic acid" is intended to embrace both acrylic acid and methacrylic acid. The comonomer content of the copolymer may amount to 70% by weight of the copolymer, preferably about 0.5 to 35% by weight, most preferably about 1 to 30% by weight.

If using a graft polymer, this may have been produced e.g. by any of the two methods described in U.S. Pat. No. 3,646, 155 and U.S. Pat. No. 4,117,195, respectively.

The silane-group containing polyolefin (A) preferably contains 0.001 to 15% by weight of the silane compound, more preferably 0.01 to 5% by weight, most preferably 0.1 to 2% by weight.

The polymer composition according to the invention may further contain various additives, such as miscible thermoplastics, antioxidants, further stabilizers, lubricants, fillers, and foaming agents.

As antioxidant, preferably a compound, or a mixture of such compounds, is used which is neutral or acidic, must comprise a sterically hindered phenol group or aliphatic sulphur groups. Such compounds are disclosed in EP 1 254 923 to be particularly suitable antioxidants for stabilisation of polyolefins containing hydrolysable silane groups which are crosslinked with a silanol condensation catalyst, in particular an acidic silanol condensation catalyst. Other preferred antioxidants are disclosed in WO2005003199A1.

Preferably, the antioxidant is present in the composition in an amount of from 0.01 to 3 wt %, more preferably 0.05 to 2 wt %, and most preferably 0.08 to 1.5 wt %.

The silanol condensation catalyst usually is added to the silane-group containing polyolefin by compounding the polymer with a so-called master batch, in which the catalyst, and optionally further additives such as a pigment, are contained in a polymer, e.g. polyolefin, matrix in concentrated form.

Accordingly, the present invention also pertains to a master batch for a crosslinkable polyolefin composition comprising a matrix polymer, a silanol condensation catalyst (B) in any of the above described embodiments.

The matrix polymer is preferably a polyolefin, more preferably a polyethylene, which may be a homo- or copolymer of ethylene, e.g. low density polyethylene, or polyethylene-methyl-ethyl-butyl-acrylate copolymer containing 1 to 50 percent by weight of the acrylate, and mixtures thereof. More preferably, a high density or medium density polyethylene is used as a matrix polymer. Furthermore, it is preferred that the matrix polymer is a bimodal polymer.

As stated, in the master batch the compounds to be added to the silane group containing polyolefin are contained in concentrated form, i.e. in a much higher amount than in the final composition.

The master batch preferably comprises component (B) in an amount of from 0.3 to 6 wt %, more preferably from 0.7 to 3.5 wt %.

If a pigment is used in the composition, this is preferably added via a separate pigment masterbatch in an amount of 0.01 wt.-% to 5 wt.-%. It can be contained in the master batch in an amount of 0.2 wt.-% to 50 wt.-%.

The master batch preferably is compounded with the silane group containing polymer in an amount of from 1 to 10 wt %, more preferably from 2 to 8 wt %.

Compounding may be performed by any known compounding process, including extruding the final product with a screw extruder or a kneader.

The invention also relates to an article, preferably a wire or cable, comprising the polyolefin composition in any of the above described embodiments.

Furthermore, the invention relates to the use of the polyolefin composition in any of the above described embodiments for the production of an article, in particular a wire or cable.

The following examples serve to further illustrate the present invention.

EXAMPLES

1. Measurement Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR for ethylene polymers is determined at 190° C. and may be determined at different loadings such as 2.16 kg ($MFR_2$) or 21.6 kg ($MFR_{21}$).

2. Compositions Produced a) Master batches

Master batches (MB) were produced comprising:
- a matrix resin: an ethylene butylacrylate copolymer comprising 17 weight % butylacrylate, with a $MFR_2$ of 4.0 g/10 min;
- a silanol condensation catalyst: as indicated in Table 1
- an antioxidant: Lowinox CPL The components were used in the master batches in the amounts as indicated in Table 2. Compounding of the master batches was performed using a Brabender kneader.

TABLE 1

| Catalyst | Comparative Example 1 | Comparative Example 2 | Example 1 | Example 2 |
|---|---|---|---|---|
| Name | Dodecyl-benzene sulphonic acid | Octadecyl-benzene sulphonic acid | Bis (docusa) benzene sulphonic acid | Docusa benzene sulphonic acid |
| Aromatic group | Benzene | Benzene | Benzene | Benzene |
| Number of $R^1$ groups | 1 | 1 | 2 | 1 |
| Chain length of $R^1$ group | 12 | 18 | 22 | 22 |
| Number of Sulphonic acid groups | 1 | 1 | 1 | 1 |
| Molecular weight (g/mol) | 326 | 410 | 774 | 466 |
| Hydrophobicity | 0.33 | 0.24 | 0.12 | 0.21 |

TABLE 2

| | MB Comp. Example 1 | MB Comp. Example 2 | MB Example 1 | MB Example 2 |
|---|---|---|---|---|
| Matrix resin as described above | 92.5% | 92.1% | 92.5% | 91.86% |
| Sulphonic acid type | Comp ex 1 | Comp ex 2 | Example 1 | Example 2 |
| Sulphonic acid content | 1.5% | 1.9% | 1.5% | 2.14% |
| Antioxidan Type | Lowinox CPL | Lowinox CPL | Lowinox CPL | Lowinox CPL |
| Antioxidant content | 6% | 6% | 6% | 6% |

As the active catalyst part of the catalyst is the sulphonic acid, the contents were designed to have the same level of active component, except the MB of Example 1 had a significant lower content of the active component in order to confirm the better performance of the catalyst.

b) Compositions

The master batches of Table 1/2 were compounded in an amount of 5 wt. % each with 95 wt. % of a silane group containing polyethylene having a density of 923 kg/m$^3$, a $MFR_2$ of 0.9 g/10 min and a silane copolymer content of 1.3% by weight in a Brabender kneader followed by tape extrusion.

c) Crosslinking Speed And Crosslinking Degree

With this method it is possible to follow the crosslinking during the test and determine the crosslinking rate and total crosslinking degree. The test requires a lab batch mixer e.g. a brabender kneader, with a preferable mixer capacity of 25 to 500 g, with an option to measure the melt temperature and the momentum of the rotors. These parameters are plotted during the test. First the catalyst masterbatch (5%) and the silane group containing polyethylene (95%) are mixed.

If a pigment is included in the test as here then 1% of the pigment is included. Then these components are melt mixed at a temperature of 130° C. until a homogenous melt is obtained. Then the crosslinking is started by adding ice to the melt. The momentum is recorded and plotted against time. The crosslinking rate is calculated from the slope of the curve. For clarity, the slope is calculated between the torque values and times at 20% and 80% of the maximum torque value. The crosslinking level is the maximum torque value. For obtaining a good crosslinking, a rate of minimum 0.12 Nm/s and a maximum toque value of minimum 50 Nm are required.

The pigment tested used is Irgalite 2BP (red) supplied by Ciba.

The results of the tests are given in Table 3:

TABLE 3

| Masterbatch used | MB Comp example 1 | MB Comp example 2 | MB example 1 | MB example 2 |
|---|---|---|---|---|
| Max torque value (Nm) | 29.2 | 45.1 | 51.4 | 51.8 |
| Crosslinking rate (Nm/s) | 0.04 | 0.08 | 0.19 | 0.14 |

Hence, only masterbatch Example 1 and 2 have an adequate crosslinking speed and final crosslinking level shown by a max torque above 50 Nm and crosslinking rate above 0.12 Nm/s. None of the comparative examples did reach any of these levels.

d) Hotset 2 mm thick tapes were extruded using 95% of the silane group containing polymer as mentioned in item b) and 5% of the catalyst masterbatch. Then the tapes were crosslinked in a) 90° C. waterbath for 2 hours; or
b) in a climate chamber at 23° C. and 50% relative humidity for 4 days (96 h). Dumbels was stamped out. Then hot set elongation was perfomed in an owen at 200° C. with a load on the dumbels of 20N.

Results of the hot set tests are given in Table 4:

TABLE 4

| Masterbatch used | MB Comp Example 1 | MB Comp Example 2 | MB Example 1 | MB Example 2 |
|---|---|---|---|---|
| Hotset elongation after 2 h at 90° C. | 45 | 40 | 35 | 35 |
| Hot set elongation after 4 d at 23° C. and 50% relative humidity | 55 | 60 | 60 | 55 |

A good crosslinking will give a low hotset value. Industry standard is usually below 75% elongation. As can be seen from the Table 4, all Examples have a hotset that shows that they are suitably crosslinked. MB Example 1 has in spite of a lower amount of active catalyst similar or even better crosslinking behaviour compared to comparative examples.

The invention claimed is:

1. A process for producing an article comprising extrusion of a polyolefin composition comprising
   i. a crosslinkable polyolefin with hydrolysable silane groups (A), and
   ii. a master batch composition, comprising:
      (iia) a matrix polymer, and
      (iib) a silanol condensation catalyst comprising an organic sulphonic acid (B), the organic sulphonic acid (B) comprising one or more sulphonic acid groups and a structural element $$Ar-R^1 \tag{I}$$

wherein Ar is an aromatic group, and $R^1$ is an organic residue comprising at least 21 C-atoms, and wherein Ar may comprise from one to four $R^1$ organic residues, and wherein the extrusion is conducted at a temperature in the range of 140 to 280° C., and wherein the composition is cross-linked to a maximum torque level of more than 50 Nm at a cross-linking rate of above 0.12 Nm/s.

2. The process according to claim 1, wherein Ar is a phenyl group.

3. The process according to claim 1, wherein at least one $R^1$ is a hydrocarbyl group.

4. The process according to claim 1, wherein the number of $R^1$ groups attached to Ar is 2.

5. The process according to claim 1, wherein the sulphonic acid group(s) is/are attached to the aromatic group Ar.

6. The process according to claim 1, wherein the organic sulphonic acid (B) has a $M_w$ of 420 g/mol or more.

7. The process according to claim 1, wherein the organic sulphonic acid (B) has a hydrophobicity to hydrophilicity ratio, defined to be the overall molecular weight of the sulphonic acid group(s) in (B) divided by the overall molecular weight of the non-polar groups in (B), of below 0.24.

8. The process according to claim 1, wherein the organic sulphonic acid (B) is present in an amount of 0.0001 to 6 wt %.

9. The process according to claim 1, wherein the polyolefin composition further comprises a pigment.

10. The process according to claim 9, wherein the pigment is present in the composition in an amount of 0.01 to 2% by weight.

11. The process according to claim 1, wherein the crosslinkable polyolefin with hydrolysable silane groups (A) comprises a polyethylene with hydrolysable silane groups.

12. The process according to claim 1, wherein in the crosslinkable polyolefin with hydrolysable silane groups (A) the silane groups are present in an amount of 0.001 to 15 wt % of component (A).

13. The process according to claim 1, wherein the article is a wire or cable.

* * * * *